Figure 1:
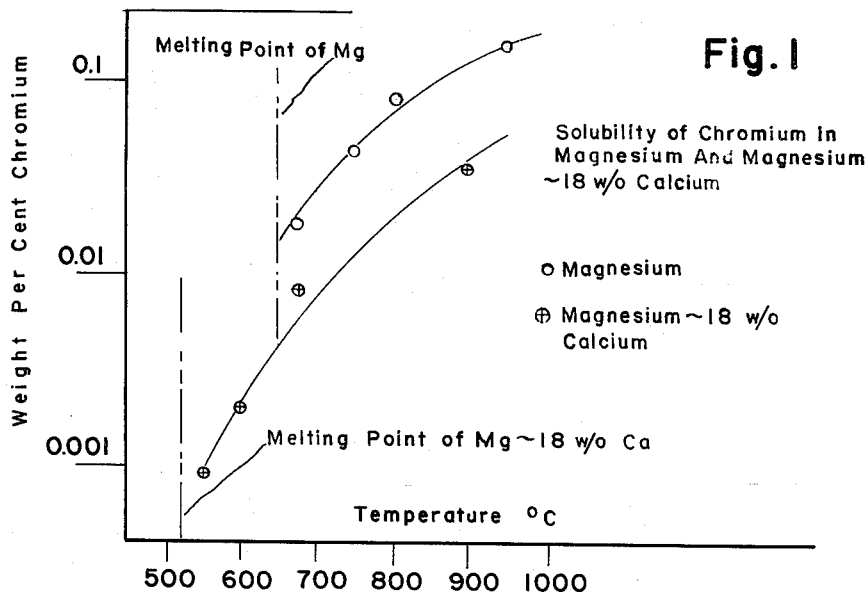

July 18, 1961 P. A. NELSON 2,992,915
PYROMETALLURGICAL METHOD
Filed Sept. 29, 1959 2 Sheets-Sheet 1

INVENTOR.
Paul A. Nelson

INVENTOR.
Paul A. Nelson

2,992,915
PYROMETALLURGICAL METHOD

Paul A. Nelson, Wheaton, Ill., assignor to the United States of America as represented by the United States Atomic Energy Commission
Filed Sept. 29, 1959, Ser. No. 843,324
3 Claims. (Cl. 75—84.1)

The invention relates to an improved pyrometallurgical method of separating metals, more particularly of separating plutonium from solutions of uranium, chromium and magnesium resulting from the processing of fuels and blankets from nuclear reactors.

Present day nuclear reactors of the thermal-neutron type utilize as fuel either natural uranium with the isotopic composition occurring in nature, or slightly enriched with the fissionable isotope 235. In either case, as the reaction proceeds fuel "burnup" takes place which, however, is not only due to actual depletion of the fissionable material as the term implies, but also to the accumulation of fission products of large thermal neutron absorption cross-section which interfere with the nuclear reaction; also, in the case of reactors of the "canned" fuel type, thermal distortion of the fuel elements and the buildup of pressure by gaseous fission products such as xenon, tend to rupture the "cans" and thereby release the dangerously radioactive materials into the coolant system of the reactor. For these reasons periodic shut-downs are necessary in order that the fuel may be "reprocessed." This is a rather complex procedure and what has to be done varies, as might be expected, with the type of reactor; in those of the canned type, the canning metal is practically inseparable from the fuel and has to be either dissolved or melted along with it, and in all cases the numerous fission products and the transmutation products such as plutonium are all present in the initial solution or melt, as the case may be, depending on whether one of the "chemical" or "aqueous" dissolving methods is selected, or a pyrometallurgical melting method. The present invention is addressed only to the latter, where the initial reprocessing step consists of melting up the fuel, along with the fission products, transmutation products, and any associated reactor core components by means of heat and without the aid of any aqueous or other "chemical" solvent. A great advantage of pyrometallurgical methods over chemical methods of reprocessing is that a much smaller volume of material has to be handled; in either case all operations have to be carried out behind shielding by remote control so that any reduction in size results in great economies in shielding and equipment costs. Another advantage is that pyrometallurgical methods keep the metals such as uranium and plutonium in the metallic state throughout the operation, rather than oxidizing them to their salts and later returning them to the metallic state by a reduction process.

The first reprocessing step is ordinarily the separation of the structural metals of the reactor core, if any, such as aluminum and zirconium. This is not especially difficult and many methods are known for bringing this about, but these are preliminary to, rather than a part of, the invention. The removal of fission products ordinarily is next in order, some of which is done quite easily, but some with more difficulty as in the case of the heavy group of fission products; however, many different pyrometallurgical methods for carrying out these separations are known and they are likewise preliminary to, rather than a part of, the invention. It should be mentioned that it is not essential in all cases to remove all of the fission products and all of the structural materials; the fission products of large neutron absorption cross-section must, of course, be removed either completely or at least to quite a high degree before the fuel may be used again; fission products having comparatively small cross-sections need to be removed only to the extent necessary to prevent the accumulation of unduly large amounts, and a few fission products actually are a benefit such as molybdenum which alloys with uranium to give it improved thermal stability, so that in a reactor designed to produce power, it is intentionally retained. Of course, in the case of a reactor designed to produce isotopes in a pure form, or for scientific research, a higher degree of purification may be needed.

After the removal of the structural materials and the fission products to the extent required, the most difficult phase of reprocessing follows; that of separating the transmutation product, plutonium, from the uranium. This need not in all cases be done completely, since a limited amount of plutonium may be permitted to accompany the fuel back into the reactor where it is itself fissionable and can contribute to the power output. However, too great an accumulation of plutonium would result in a fuel enriched beyond the capacity of the geometry and control mechanism of the reactor, and, of course, it may be desired to harvest the plutonium as it comes from the reactor after each run for other purposes, such as use in a purely plutonium type of reactor. For either reason, it is apparent that it is desirable to separate plutonium from uranium in the case of thermal reactors.

In the case of fast-neutron reactors, there is even greater need for separating the metals just mentioned pyrometallurgically. While the cores of reactors of this type with their high degree of uranium 235 enrichment contain less of the parent uranium 238 than thermal cores, the lowered production of plutonium within the core is usually more than compensated for by its production within the "blanket" surrounding the core. This blanket is most commonly of natural uranium, although the ideal uranium material would be the 238 isotope in its pure form, since it contains the highest possible concentration of parent material for the production of plutonium, and "depleted" uranium, the by-product of uranium 235 production is therefore used when available for blanketing purposes. When a fast-neutron reactor is shut down for fuel renewal, it is customary to extract the plutonium from the blanket at the same time.

Of course, these processes, though contemporaneous, are not carried out within the same containers, since any commingling of the enriched uranium of the core and the natural or depleted uranium of the blanket would result in a need for a highly expensive isotopic separation; in all fast reactors, whether of the solid fuel or liquid fuel types, some kind of barrier is interposed to keep the core and blanket physically separate from each other, and during reprocessing the separation is continued. Plutonium may, of course, be generated within the core as well as in the blanket, and its separation from the core is carried out in the general manner described with reference to reprocessing of cores of the thermal reactors. The reprocessing of blanket materials follows about the same general course except that quantitatively the proportion of fission products is much smaller than in the case of cores, although these are always present to some extent even in the case where pure uranium 238 is the blanket material due to the fission of the plutonium produced within the blanket by reason of the neutron flux. A further difference is to be noted in the case of certain fast reactors of the liquid metal type; it has been proposed to add chromium to the uranium in proportions at or near the uranium-chromium eutectic of 5 weight percent (w/o) chromium; this melts at 860° C. and a blanket or core of this composition is far less corrosive to the containing vessels than pure uranium which melts at around 1133° C.

From the foregoing, it is apparent that in reprocessing fast reactor cores and blanket materials at some point a metallic solution may be encountered comprising principally uranium, chromium, and plutonium requiring separation into its components. One of the most promising, if not the most promising pyro-metallurgical methods of doing this is that of magnesium extraction; since this metal in the liquid state is nearly immiscible with uranium, but quite miscible with plutonium, a contact between liquid magnesium and a fused solution containing uranium will result in the formation of two phases, whereupon the other metals dissolved in the uranium will diffuse into the magnesium phase in varying degrees. Plutonium will diffuse into the magnesium phase according to a relationship of about 0.2 mole fractions of plutonium in magnesium per mole fraction of plutonium in uranium. This is equivalent to an extraction coefficient of about 2 on a weight basis. (See I. O. Winsch and L. Burris, Jr., Magnesium Extraction Process for Plutonium Separation from Uranium, Chem. Eng. Progress, 53, May 1957, pp. 237–242.)

Some kind of agitation is usually employed to hasten the diffusion between the two phases, such as stirring, shaking and the like which is continued until equilibrium is reached; thereafter the agitation is discontinued and the phases permitted to separate into two discrete volumes which are then removed into separate vessels by decantation, filtration and the like. Such decantation or filtration may be made easier and more complete by permitting the uranium-rich phase to solidify beforehand, but separation may also be made with both phases still in the liquid state. As in all liquid-liquid extractions the degree of removal of the plutonium from the uranium phase may be regulated by the amount of extractant, in this case liquid magnesium, which is used; more complete removal may be effected by a given amount of extractant if it is subdivided into portions which contact the uranium phase successively, rather than when the entire volume of extractant is used in a single contact, as is well known in the extraction art. After the extraction the extractant phase of magnesium, together with the metals which have diffused into it out of the uranium phase, is then treated, usually by distillation, whereby the magnesium with its lower boiling point vaporizes and is condensed in another vessel, leaving behind the metals such as plutonium with higher boiling points. Details of the method of distillation used are to be found in the Winsch and Burris, Jr., article above referred to and the distillation is to be considered to be a part of the overall process of plutonium separation of which the present invention is an improvement, as will be disclosed later on.

While the plutonium separation process by liquid magnesium extraction described in the publication mentioned has been quite successful generally, one disadvantage remains; the magnesium, in addition to extracting the plutonium from the uranium phase, or uranium-rich phase as it is also called with more accuracy, also extracts appreciable amounts of chromium, which is difficult to separate from the plutonium since it does not vaporize and leave during the distillation like the magnesium, but remains with the plutonium thereby becoming a serious and undesirable contaminant in many, if not most, plutonium applications. Another disadvantage is that although magnesium is nearly insoluble in uranium the reverse is not true; uranium is slightly soluble in magnesium and during the extraction diffuses into the magnesium or magnesium-rich phase to an extent that it becomes a serious contaminant of the plutonium just as does chromium, and again, like the chromium, it does not vaporize and leave during the ensuing distillation.

Reference is now made to the drawings:

FIGURE 1 plots semi-logarithmically the solubility in weight percent (w/o) of chromium in magnesium as ordinates against temperature in ° C. as abscissae as shown by the upper curve. The lower curve plots the w/o solubility of chromium in an alloy of 18 w/o calcium, balance magnesium, against temperature in the same manner.

Figure 2:
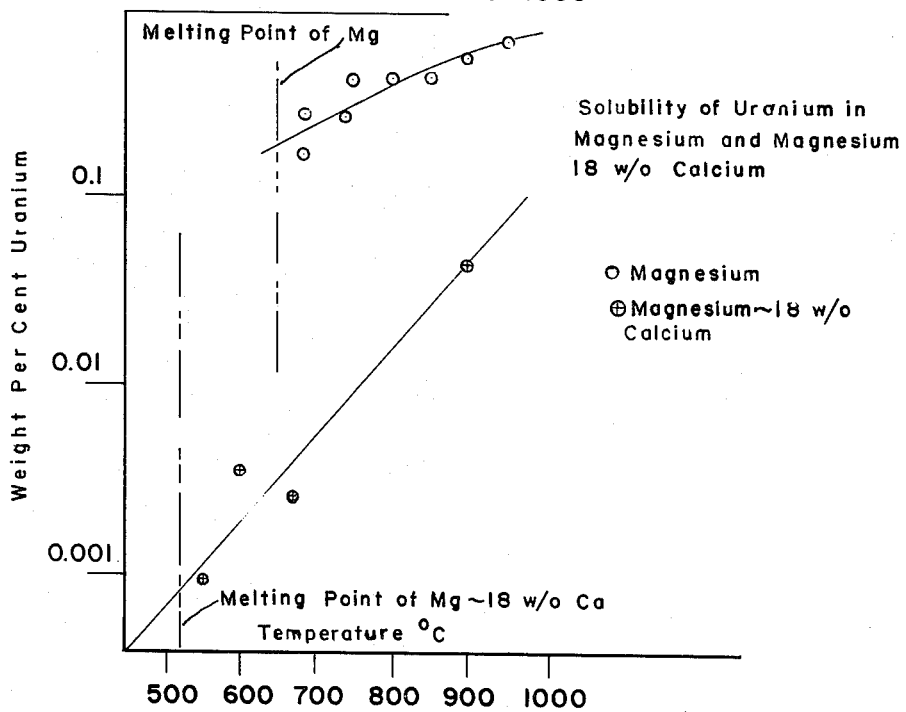

FIGURE 2 plots the w/o solubility of uranium in magnesium (upper curve) and in the alloy mentioned (lower curve) against temperature in the same manner.

Figure 4:
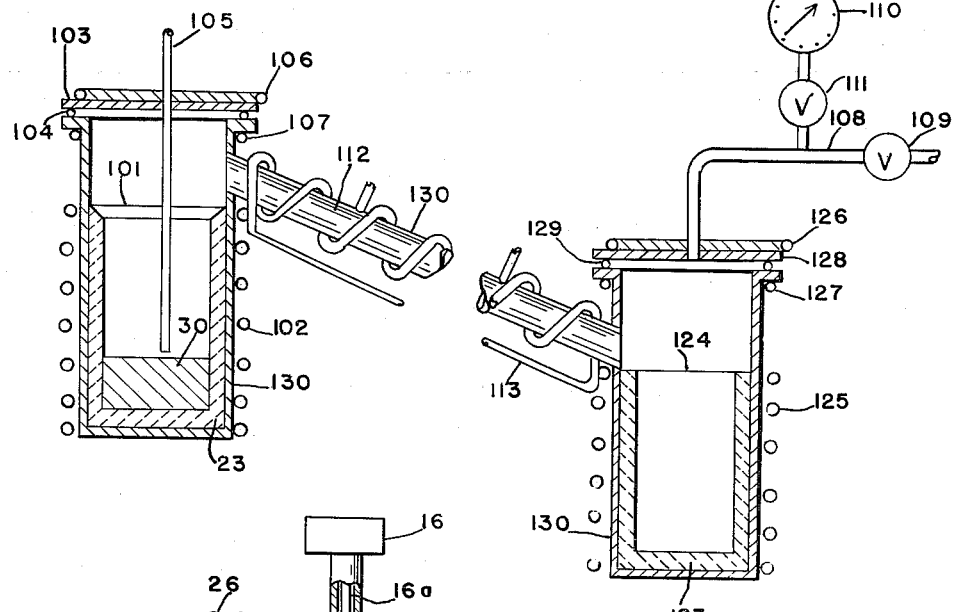
Figure 3:
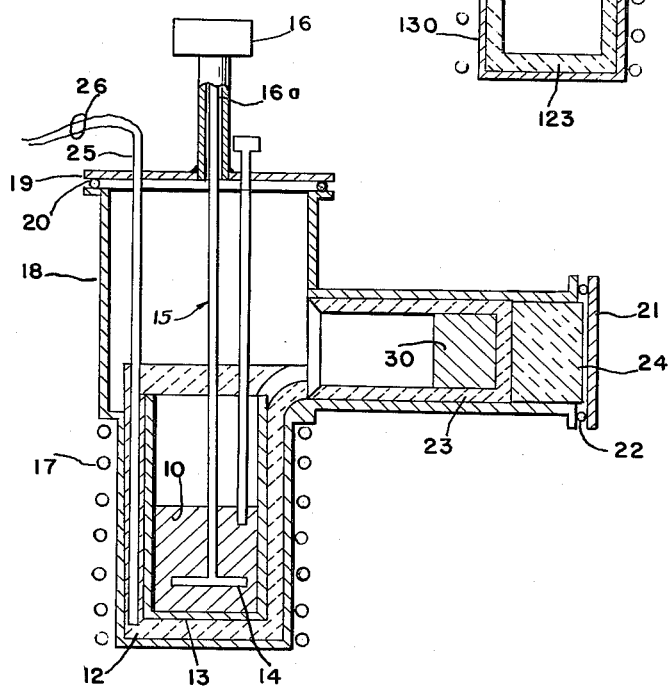

FIGURE 3 is a schematic representation of an extraction unit used in carrying out the invention, and FIGURE 4 is a schematic representation of a magnesium distillation unit.

It is an object of the invention to show a pyrometallurgical method of separating plutonium from uranium.

It is a more particular object of the invention to show a method for separating plutonium from uranium alloyed with chromium.

It is more particularly an object of the invention to show a method for separating chromium and uranium from a metallic solution predominately of magnesium and comprising plutonium, chromium and uranium.

It is a further object of the invention to show an improvement of the method of liquid magnesium extraction of plutonium from a chromium alloy of uranium, followed by distillation of the magnesium.

All the foregoing objects are attained by my discovery that after the liquid magnesium extraction of plutonium from the chromium-uranium alloy is completed and the phases separated as above described, if calcium is then added to the magnesium-rich phase in at or near eutectic proportions, not only will the freezing point be lowered as expected, but also a marked decrease in solubility of both chromium and uranium will result at any temperature, as is clearly shown by FIGS. 1 and 2. Furthermore, as the temperature is lowered, the solubilities decrease still further with the result that by lowering the temperature below the freezing point of the untreated magnesium-rich phase, but above that of the calcium alloy described, an over twenty-fold decrease in chromium solubility and an over two-hundred-fold decrease in uranium solubility may be effected, as is best shown by the logarithmic ordinates of FIG. 1. In this way, the unwanted chromium and uranium contaminants will precipitate and may then be removed by filtration, decantation and the like, and the light magnesium and calcium metals then distilled away to leave the plutonium in decontaminated condition.

It is thus apparent that the invention can be used for separating uranium with or without chromium from magnesium and plutonium and from magnesium alone. Likewise, chromium alone can be extracted from magnesium by the process of my invention.

Two slightly different variations may be used for carrying out my invention; the first of these is to make the liquid magnesium extraction with pure magnesium, then to separate the phases and add the calcium to the magnesium-rich phase whereupon the chromium and uranium will precipitate as the temperature is lowered toward the melting point of the magnesium-calcium alloy as shown by FIGS. 1 and 2. At 550° C., the solubilities of both uranium and chromium will be less than 0.001 w/o, and below that, both solubilities rapidly approach zero. After the precipitation, the magnesium phase may then be separated by decanting, filtering or the like, leaving the precipitate behind. This variation is preferable when it is desired to extract the maximum amount of plutonium from the uranium. However, when simplicity and economy rather than a maximum extraction are desired, as in the case of power reactors, it is probably preferable to do the contacting with the magnesium-calcium alloy initially; the presence of the calcium may inhibit a minor amount of plutonium from diffusing into the extractant phase, but not only this can be corrected for by using a greater volume of extractant, but even without this correction the amount of plutonium allowed to remain with the uranium will usually be found well within the acceptable limits for plutonium within the reactor. The advantage of this second variation, is that it avoids the additional separation of the extractant from the chromium and uranium precipitate of the first variation; instead these metals are simply kept from diffusing into the extractant phase in the first place, and remain with the uranium where, for power reactors, at least, they are desirable.

With either variation, however, the principle of my invention is essentially the same. In neither is it necessary that the calcium be added to the magnesium in strictly eutectic proportions, but anything within a few percentage points either way gives satisfactory results. The magnesium-calcium eutectic is 16 w/o calcium which would theoretically give the best results. I have found, however, that an 18 w/o calcium-82 w/o magnesium alloy works quite well even though the calcium content exceeds the eutectic by about 2 w/o.

Referring to FIG. 3, the charge 10 consisting of the uranium solution, and magnesium alone if the first variation is being carried out, or the magnesium-calcium alloy in the case of the second variation is placed in graphite crucible 12 with a tantalum liner 13, the whole being enclosed by stainless steel shell 18, lids 19, and 21, and aluminum gaskets 20 and 22. The charge is agitated by tantalum stirrer 14 on tantalum shaft 15 communicating with solenoid 16, which provides a vertically reciprocating motion to the rod 16a. The charge is kept initially at a temperature above the melting point of the entire charge by induction heating coil 17 until equilibrium is reached, which normally takes about half an hour with a stirrer reciprocating about 600 times per minutes at 1000° C. Thereafter, a sufficient time should be allowed for phase separation to become complete, the stirrer, of course, being shut off during the phase separation. The whole apparatus is then tilted clockwise by a tilting means (not shown) so as to pour off the upper magnesium-rich phase from crucible 12 into vessel graphite 23; preferably this is done at a temperature below the freezing point of the lower, uranium-rich phase, but above that of the magnesium-rich phase. Vessel 23 may consist in addition to graphite of cast-iron, high chrome stainless steel substantially free of nickel, low carbon steel, copper, or any material resistant to magnesium-rich materials such as beryllium, thorium, alumina, magnesia, or silicon carbide; it rests on zirconia-insulator 24 after the tilting has gone through 90 degrees. Thermocouple 25 measures the temperature of the charge in crucible 12, and the temperature of the coil 17 may, of course, be controlled either manually or by an automatic mechanism connected to the thermocouple wires 26, as is known in the instrumentation art. It is understood, of course, that this simple batch apparatus may be replaced by one of the continuous type with the lines connecting vessels kept at proper temperatures by overall space heating, and with pumps replacing the tilting mechanism as is known in the chemical processing art.

After the entire magnesium phase has been poured into vessel 23, the entire apparatus is permitted to cool below the point where the magnesium phase hardens into an ingot 30 within the graphite vessel 23, and they may be removed by opening lid 21.

If the first variation of the invention is being carried out either ingot 30 is removed from vessel 23 and placed in a clean crucible similar to crucible 12 or vessel 23 is itself a crucible similar to crucible 12; the requisite amount of calcium is added to the crucible charge, the apparatus is tilted back counterclockwise to its original position; the new crucible placed in the position formerly occupied by crucible 12, the induction heater 17 turned on again until the new charge melts, the stirrer is then turned on for a time sufficient to mix the calcium and magnesium together, and then the heating is reduced until the temperature of the charge falls to below the freezing temperature of magnesium, but slightly above the freezing temperature of the calcium-magnesium alloy. The chromium and uranium fall to the bottom of the crucible as a fine precipitate, and after this has settled, the whole apparatus is carefully tilted clockwise again so that the liquid alloy phase runs into a clean vessel similar to vessel 23 where it hardens into an ingot, the precipitate remaining in the crucible. Alternately, the precipitate may be removed from the alloy liquid phase by pouring the charge through a filter such as a filter of sintered tantalum, sintered alumina, beryllia, or the like. Also, in case complete plutonium recovery is essential, the precipitate may be washed with an additional portion of extractant alloy, which is then removed by decantation, filtering or the like.

If the second variation of the invention is carried out, the ingot 30 hardening in vessel 23 after the first pouring may simply be removed and placed directly in the distillation apparatus of FIG. 4; in the case of the first variation, the ingot from the second pouring is so placed. After either of these steps, the process is identical regardless of which variation was employed. The uranium phase which hardened in crucible 12, and likewise the precipitate if the first variation were used, require no further processing for use in a power reactor so that their reprocessing may be considered completed. The ingot 30 from the extractant phase, however, requires further separation by distillation of the calcium and magnesium metals.

Referring to FIG. 4, the ingot 30 along with its containing vessel 23 (or in the case of the first variation, the vessel similar to vessel 23) is placed in the still pot chamber 101, surrounded by resistance heater 102, by opening lid 103, which is then replaced and made gastight by means of mild steel gasket 104. Thermocouple container 105 is lowered to a point on or close to ingot 30 and the heater 102 is turned on to raise the temperature of ingot 30 sufficiently to cause vaporization of the calcium and magnesium metals. I prefer a temperature of about 725° C. for this purpose and a pressure of 10 mm. mercury, which is maintained through line 108, controlled by valve 109, leading to a pump (not shown). Gauge 110, connected to line 108 through valve 111, is used to control the pressure either manually or automatically. Heaters 106 and 107 are placed near the top of still pot chamber 101 to prevent condensation before the vapors reach condenser 112. Condenser 112 is surrounded by heating coil 113 which heats it sufficiently to prevent solidification of the distilled metals, which pass into the graphite receiving vessel 123 within receiving chamber heated by resistance heater 125. Heaters 126 and 127 near the top of receiving chamber 124 prevent condensation, and the entire system is made gastight by lid 128 and mild steel gasket 129. All the outer shell 130 of the distillation unit is of chrome stainless steel substantially free of nickel. Distillation proceeds in the usual way until the calcium and magnesium completely leave vessel 23 and only plutonium remains behind.

EXAMPLE I

Approximately 1000 g. of an alloy of 95 w/o uranium and 5 w/o chromium (U–5 w/o Cr) were melted with 500 g. of magnesium in a tantalum lined crucible at 950° C. The melt was agitated with a solenoid operated agitator. Samples of the magnesium-rich phase were removed with a Vycor glass tube fitted with a syringe bulb.

The average chromium concentration of nine samples obtained from three different runs of this type was 0.156 w/o chromium with a standard deviation of 0.005 w/o. The uranium concentration was 0.064 w/o.

The magnesium-rich phase from one of these runs was separated from the uranium-rich phase by decanting at 800° C., below the melting point of uranium-5 w/o chromium. This magnesium ingot was reheated in an alumina crucible to 900° C. and cooled to 675° C. Since the magnesium-rich phase had been separated from the uranium-rich phase at 800° C., the concentration of chromium and uranium in the 900° sample corresponded to the solubilities in magnesium at approximately 800° C. The solubility of chromium in magnesium obtained by these experiments is tabulated in Table I and plotted in FIGS. 1 and 2. Also the solubility of uranium obtained in these experiments and other similar experiments is tabulated in Table I and plotted in FIGS. 1 and 2.

Table I
SOLUBILITY OF URANIUM AND CHROMIUM IN MAGNESIUM

| Temperature, ° C. | Chromium, w/o | Temperature, ° C. | Uranium, w/o |
| --- | --- | --- | --- |
| 950 | [1] 0.154 | 950 | [1] 0.064 |
| 800 | 0.082 | 900 | [2] .053 |
| 750 | 0.044 | 850 | [2] .040 |
| 675 | 0.0184 | 800 | [2] .040 |
|  |  | 750 | .040 |
|  |  | 740 | [2] .028 |
|  |  | 675 | .026 |
|  |  | 675 | [2] .016 |

[1] Average of several samples.
[2] Uranium-rich phase consisted of U-5 w/o Cr-1 w/o Fe.

EXAMPLE II

A magnesium extract from one of the previously described experiments was heated with agitation in the presence of enough calcium to form magnesium-18 w/o calcium. The melt was sampled at 900, 675, 600, and 550° C. with a stainless steel tube which was coated internally with graphite. The very low uranium and chromum concentration obtained are tabulated in Table II and plotted in FIGS. 1 and 2.

Table II
SOLUBILITY OF URANIUM AND CHROMIUM IN MAGNESIUM-18 W/O CALCIUM

| Temperature, ° C. | Chromium, w/o | Uranium, w/o |
| --- | --- | --- |
| 900 | 0.036 | 0.0042 |
| 675 | 0.008 | 0.00026 |
| 600 | 0.002 | 0.00035 |
| 550 | 0.0009 | 0.000096 |

EXAMPLE III 10 kg. of an alloy of 94 w/o uranium, 1 w/o plutonium and 5 w/o chromium in the solid state and 10 kg. of an alloy of 84 w/o magnesium and 16 w/o calcium also in the solid state are placed in a tantalum lined graphite crucible of the type shown in FIG. 3, and the crucible is placed in a tilting apparatus of the type shown by FIG. 3. The induction coil heater is turned on, the apparatus degassed at 400° C. with a mechanical vacuum pump after which argon is introduced and an argon atmosphere maintained thereafter. The temperature of the charge, as determined by the thermocouple, is raised to 1000° C., which requires about five hours from the time the heating began. The stirrer is turned on at 600 r.p.m. and the 1000° C. temperature maintained for half an hour. The stirrer is withdrawn; the heating is reduced, and after the lower phase solidifies and the upper phase cools to 550° C., the apparatus is tilted and the upper liquid phase is poured off and the heating is discontinued entirely. After the entire apparatus has reached room temperature, it is retilted to its original position, opened up and the magnesium-rich ingot is removed. Ten additional kg. of the magnesium-16 w/o calcium alloy are placed in the tantalum-lined crucible on top of the hardened uranium-rich phase and the extraction procedure is repeated three more times, each with a fresh 10 kg. of extractant alloy. The four resulting ingots of uranium-rich alloy are then put together in a single vessel and placed in a distillation apparatus of the type shown in FIG. 4 and the calcium and magnesium are distilled off at 725° C. at 10 mm. mercury. The distillation apparatus is allowed to cool and the plutonium residue is analyzed, weighed, and found to be 98 g., representing a recovery of about 98%, and essentially free of chromium and uranium.

What is claimed is:

1. A method of separating plutonium from a solution of about 95 w/o uranium and 5 w/o chromium comprising contacting the solution in the liquid state with a liquid solution of about 84 w/o magnesium and 16 w/o calcium, stirring the two solutions together by a stirrer turning at about 600 r.p.m. for about 30 minutes at a temperature of about 1000° C., then permitting a magnesium-rich phase to separate from the uranium-rich phase, then pouring off the magnesium-rich phase at 550° C., transferring the magnesium-rich phase to a distillation apparatus, and then distilling off the magnesium and calcium at about 725° C. at about 10 mm. Hg to recover the plutonium.

2. In the method of separating plutonium from solution with uranium and chromium comprising contacting the solution in the liquid state with liquid magnesium, separating the resulting magnesium-rich phase from the uranium-rich phase, and then distilling the magnesium out of the magnesium-rich phase to recover plutonium, the improvement comprising adding calcium in about eutectic proportions with the magnesium to the magnesium-rich phase after separating it and before the distillation of the magnesium, and then removing the resulting precipitate of chromium and uranium from the magnesium-rich phase.

3. In the method of separating plutonium from solution with uranium and chromium comprising contacting the solution in the liquid state with liquid magnesium, separating the resulting magnesium-rich phase from the uranium-rich phase, and then distilling the magnesium out of the magnesium-rich phase to recover plutonium, the improvement comprising adding calcium to the liquid magnesium in about eutectic proportions with the magnesium prior to the contact and distilling the calcium along with the magnesium out of the magnesium-rich phase.

References Cited in the file of this patent

"Reactor Fuel Processing," prepared by Argonne National Laboratory, January 1959, vol. 2, No. 1, page 28.